(12) United States Patent
Ayers et al.

(10) Patent No.: US 7,782,555 B1
(45) Date of Patent: Aug. 24, 2010

(54) LARGE OPTICS INSPECTION, TILTING, AND WASHING STAND

(75) Inventors: Marion Jay Ayers, Brentwood, CA (US); Shannon Lee Ayers, Brentwood, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 12/492,999

(22) Filed: Jun. 26, 2009

(51) Int. Cl.
*G02B 7/02* (2006.01)

(52) U.S. Cl. .......................................... 359/811; 359/822

(58) Field of Classification Search ......... 359/694–701, 359/811–824, 364–399
See application file for complete search history.

(56) References Cited

U.S. PATENT DOCUMENTS 3,989,947 A * 11/1976 Chapman ................. 250/338.1
4,995,721 A * 2/1991 Krupa et al. ................. 356/305
5,886,800 A 3/1999 Aprahamian et al.
6,404,547 B1 * 6/2002 Hull ............................ 359/399
7,139,137 B2 * 11/2006 Sudoh ........................ 359/811

OTHER PUBLICATIONS

Yutani, M, "Cleaning procedure for mirror coating at Subaru Telescope," Proceedings of SPIE vol. 4837 (2003) pp. 887-895, Nov. 1998.
Davison, Warren B., "Handling and Transporting the 8.4 Mirrors for the Large Binocular Telescope", Astronomical Structures and Mechanisms Technology, Proceedings of SPIE, Vo. 5495 (2004) pp. 453-462, Sep. 1997.
Smith, Harlan J., "A Decade of Cost-Reduction in Very Large Telescopes (The SST as Prototype of Special-Purpose Telescopes)" Astrophysics and Space Science 160: 123-134, Nov. 1989.

* cited by examiner

*Primary Examiner*—Mohammed Hasan
(74) *Attorney, Agent, or Firm*—Eddie E. Scott; John H. Lee

(57) ABSTRACT

A large optics stand provides a risk free means of safely tilting large optics with ease and a method of safely tilting large optics with ease. The optics are supported in the horizontal position by pads. In the vertical plane the optics are supported by saddles that evenly distribute the optics weight over a large area.

3 Claims, 7 Drawing Sheets

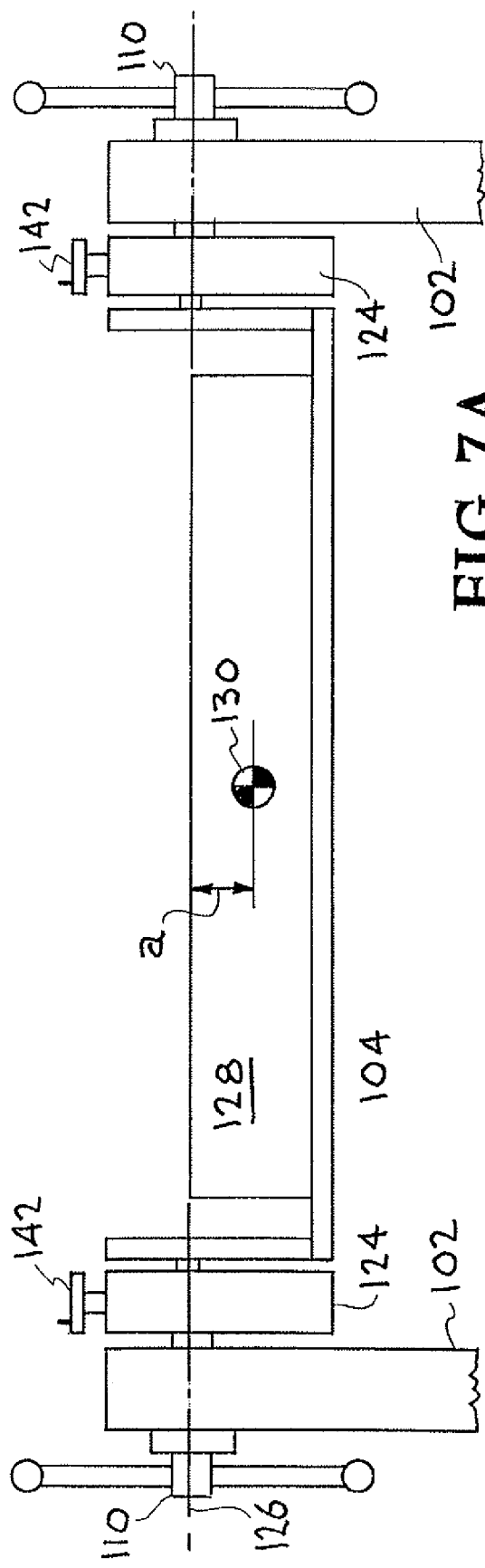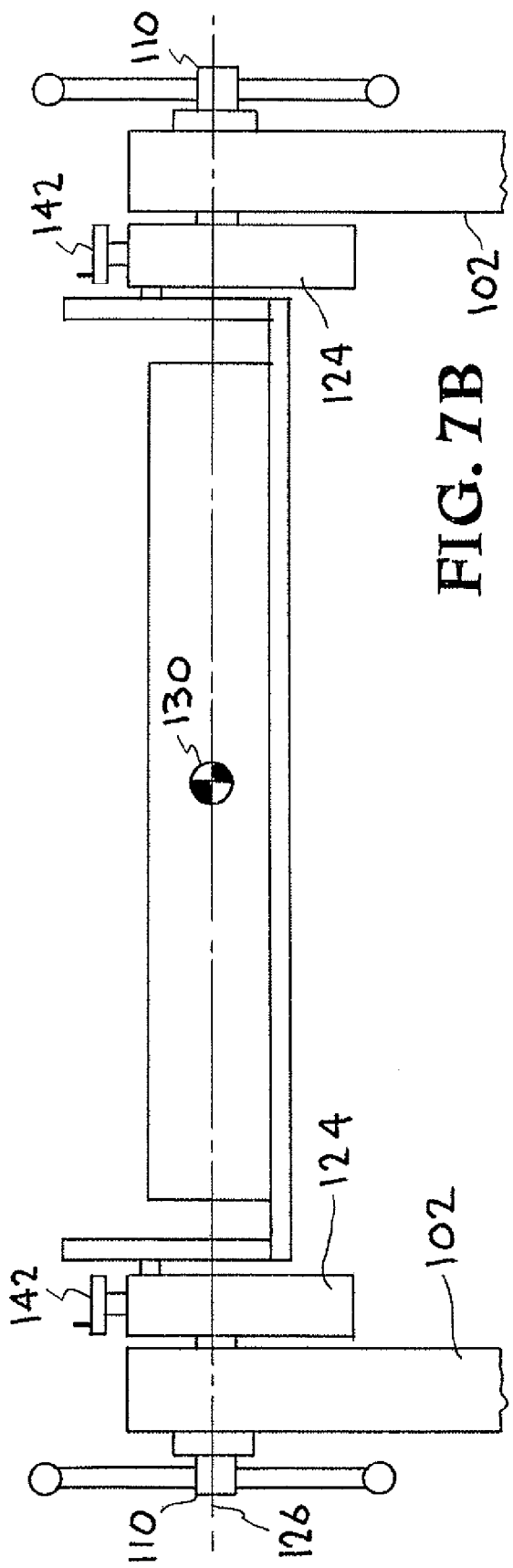
FIG. 7A
FIG. 7B

LARGE OPTICS INSPECTION, TILTING, AND WASHING STAND

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

1. Field of Endeavor

The present invention relates to large optics and more particularly to a large optics stand.

2. State of Technology

The article, "Cleaning procedure for mirror coating at Subaru Telescope," in *Proceedings of the SPIE—The International Society for Optical Engineering*, Vol. 4837, pp. 887-95 (2003) provides the following state of technology information:

"We would like to present the procedure of how to prepare the primary mirror of Subaru Telescope for the realuminization. The equipment for the coating and its preparation are located at the ground floor of the telescope enclosure. There are two trolleys for carrying the mirror cell and the mirror itself, a mirror lifting jig, a washing facility for the primary mirror (PMWF), the water purification system, the coating chamber and the waste water pit. The PMWF can provide the tap water for initial rinsing, the chemical for stripping the old coating, and the deionized water for final cleaning. It has two pairs of arms that deploy horizontally above the mirror and have nozzles to spray. The arms spin around its center where the rotary joints are connected to the plumbing from storage tanks. Deck above the water arms serve as platform for personnel for the inspection or for scrubbing work. We use hydrochloric acid mixture to remove the old aluminum coating. For rinsing and final cleaning, we use the water through the purification system. The water supply from the nozzles and the rotation of the arms can be controlled from a panel separated from the washing machine itself. After several experiments and improvements in the washing, we have carried out the coating of the 8.3 m primary mirror in September last year. This was the third time, and the reflectivity of the new coating show satisfactory result."

The article, "Handling and transporting the 8.4 m mirrors for the Large Binocular Telescope," in *Proceedings of the SPIE—The International Society for Optical Engineering*, Vol. 5495, pp. 453-62 (2004), provides the following state of technology information:

"The Large Binocular Telescope has two 8.4 meter mirrors, one of which is now in the telescope. Handling and moving the 8.4-meter honeycomb mirrors calls for moving 16 metric ton mirrors while maintaining very low stresses. We have now handled the first LBT mirror off the furnace, turned on edge, cleaned out, turned upside down, on the grinder, turned again, put on a polishing cell, moved under the polishing machine, lifted with a vacuum lifting fixture, moved to the telescope cell, to a transportation box, down the highway, onto a multi-axle trailer on edge, up Mount Graham, into the telescope building, back into the telescope cell and up through a hatch onto the telescope itself. The second LBT mirror is in the polishing stage. We have designed and manufactured many pieces of specialized equipment to handle the task. This equipment must be able to handle the mirrors without exceeding 0.7 MPa (100 psi) stress in the glass."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention is a large optics stand that provides a risk free means of safely tilting large optics with ease. The present invention also is a method of safely tilting large optics with ease. The optics are supported in the horizontal position by pads. Depending on the actual part geometry and weight, the optic support pad diameter and placement is adjusted as needed. In the vertical plane the optics are support by saddles that evenly distribute the optics weight over a large area.

Prior to the present invention the optician had to lean out over the surface of the optic for mechanical washing. The further the optician leaned over the surface of the optic, the more force that was applied to the surface of the optic by the optician's body weight being place on the optic. In addition, it is critical that cleaning of the optics be both uniform and conducted in a repeatable fashion, neither of which was possible prior to the present invention that required the optic to be in the horizontal plane. With the large optics stand of the present invention the entire surface of the optic can be cleaned repeatably with uniform force and coverage successfully.

The term "large optics" use in this application means optics having a diameter of thirty (30) inches or greater. The cost of large optics is in the hundreds of thousands of dollars to millions of dollars range. For example, the article, "A DECADE OF COST-REDUCTION IN VERY LARGE TELESCOPES" by Harlan J. Smith in the Journal, Astrophysics and Space Science, Volume 160, Numbers 1-2/March, 1989, states: "Very high quality, well-supported 8 m mirrors are currently in the $10 million class, weigh typically 10 or more tonnes, and in addition require multi-million-dollar handling fixtures and coating facilities." The disclosure of the article, "A DECADE OF COST-REDUCTION IN VERY LARGE TELESCOPES" by Harlan J. Smith in the Journal, Astrophysics and Space Science, Volume 160, Numbers 1-2/March, 1989 is incorporated herein by this reference for all purposes.

U.S. Pat. No. 5,886,800 for large optics compensated imaging systems provides the following information about the high cost of large optics: "Present day high resolution imaging telescopes are constrained in size because of the costs of fabricating high precision mirror surfaces. It has been observed that the cost of fabricating large optical mirrors goes up in proportion to the third power of the mirror diameter. Telescopes of over two to three meters in diameter are prohibitively expensive. Furthermore, the weight of a telescope primary mirror is also a limiting factor if the telescope is to be used in space, since the cost of placing any load into orbit around the earth is dependent on its weight and volume." The disclosure of U.S. Pat. No. 5,886,800 is incorporated herein by this reference for all purposes.

Uses of the large optics stand and the method of safely tilting large optics include cleaning optics, inspecting optics, displaying optics, storage optics, dressing optics (support during bonding of features), and metrology. The large optics stand and the method of safely tilting large optics can be used as a safer, more effective way, to support optics during traditional optic washing. Given that the high value optic is mechanically restrained, the inspection stand (or several stands) can be used to store optics in the vertical orientation, ultimately saving on floor space. Restraints can be put in place of the saddle supports, specific to each application, such that the optic can be evenly supported and/or isolated for optical metrology purposes.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

FIGS. 7A & 7B are additional illustrations of alignment of the large optics center of mass with the axis of rotation of the large optics stand.

DETAILED DESCRIPTION OF SPECIFIC EMBODIMENTS

Figure 1:
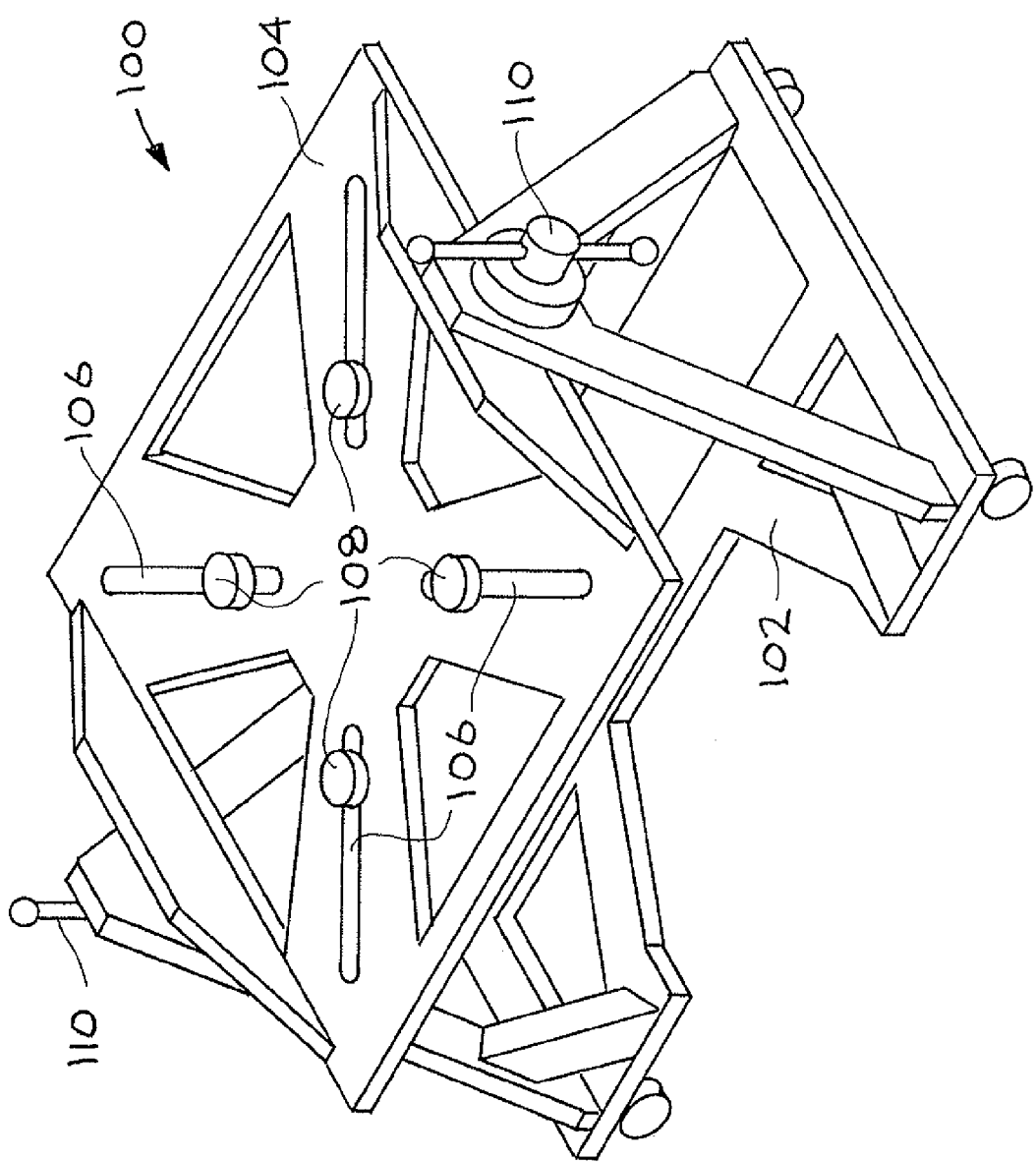
FIG. 1 illustrates one embodiment of the present invention of a large optics stand of the present invention.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Referring now to the drawings and in particular to FIG. 1, one embodiment of the present invention is illustrated. This embodiment is a large optics stand is designated generally by the reference numeral 100. The optic inspection stand 100 provides a safe and effective way of inspecting large valuable optics. The optic inspection stand 100 allows the optician to get within acceptable proximity of the optical surface without leaning over the optic (mitigating the risk of dropping objects and or contaminating the polished face). The optic inspection stand 100 not only enables inspection, but also facilitates washing and storing the high value added optics. In the prior art the optician had to lean out over the surface for mechanical washing, the further out the optician leaned, the more force that was applied to the surface (supporting their body weight). It is critical that the cleaning of the optics be both uniform and conducted in a repeatable fashion, neither of which was possible with the optic in the horizontal plane. With the optic inspection stand 100 the entire surface of the optic can be cleaned repeatably with uniform force and coverage successfully.

FIG. 1 illustrates the main components of the large optics stand 100. The stand base 102 is shown mounted on casters for ease of moving the assembly about. The rotatable optics Table 104 is mounted to the stand base 102 by the rotating and locking mechanism 110. The optics table 104 has four slots 106. The optics support pads 108 are mounted to the slots 106. As can be seen the pads 108 can be moved to different positions in the slots in order to accommodate different size optics.

In one embodiment, the support or base frame structure 102 is engineered from Al-6061 aluminum box tube. The base frame structure 102 in this embodiment is comprised of a lower Base section, two upright A Frame Structures with Mounting Flange, four A-Frame Gussets with Mounting flange, 4 Rotary Bearing Mount Plates, and four locking Casters. The Base, A-frame Structure, and Gussets are welded assemblies. The assemblies are bolted together using certified hardware into threaded machined inserts that are welded into each mating sub-assembly. Table 1 below provides a list of components of the optic stand and shows the location of components.

TABLE 1

| Component | Location |
|---|---|
| A Frame Structure | 100 |
| A Frame Gusset | 100 |
| A Frame Mounting Flange | 100 |
| Base | 102 |
| Casters | 102 |
| Lower Gusset Mounting Flange | 100 |
| Pull Handle | 100 |
| Rotary Bearing Mount Plate | 100 |
| Upper Gusset Mounting Flange | 100 |

The large optics stand 100 provides a risk free means of safely tilting large optics and or fragile high dollar value materials with ease. The optics are supported in the horizontal position by pads. Depending on the actual part geometry and weight, the optic support pad diameter and placement is adjusted as needed. In the vertical plane the optics are supported by saddles that evenly distribute the optics weight over a large area. Specially design restraints can be put in place of the saddle supports, specific to each application, such that the optic can be evenly supported and/or isolated for optical metrology purposes. This stand can also be used as a safer, more effective way, to support optics during traditional optic washing. Given that the high value added part is mechanically restrained, the inspection stand (or several stands) can be used to store optics in the vertical orientation, ultimately saving on floor space.

Figure 2:
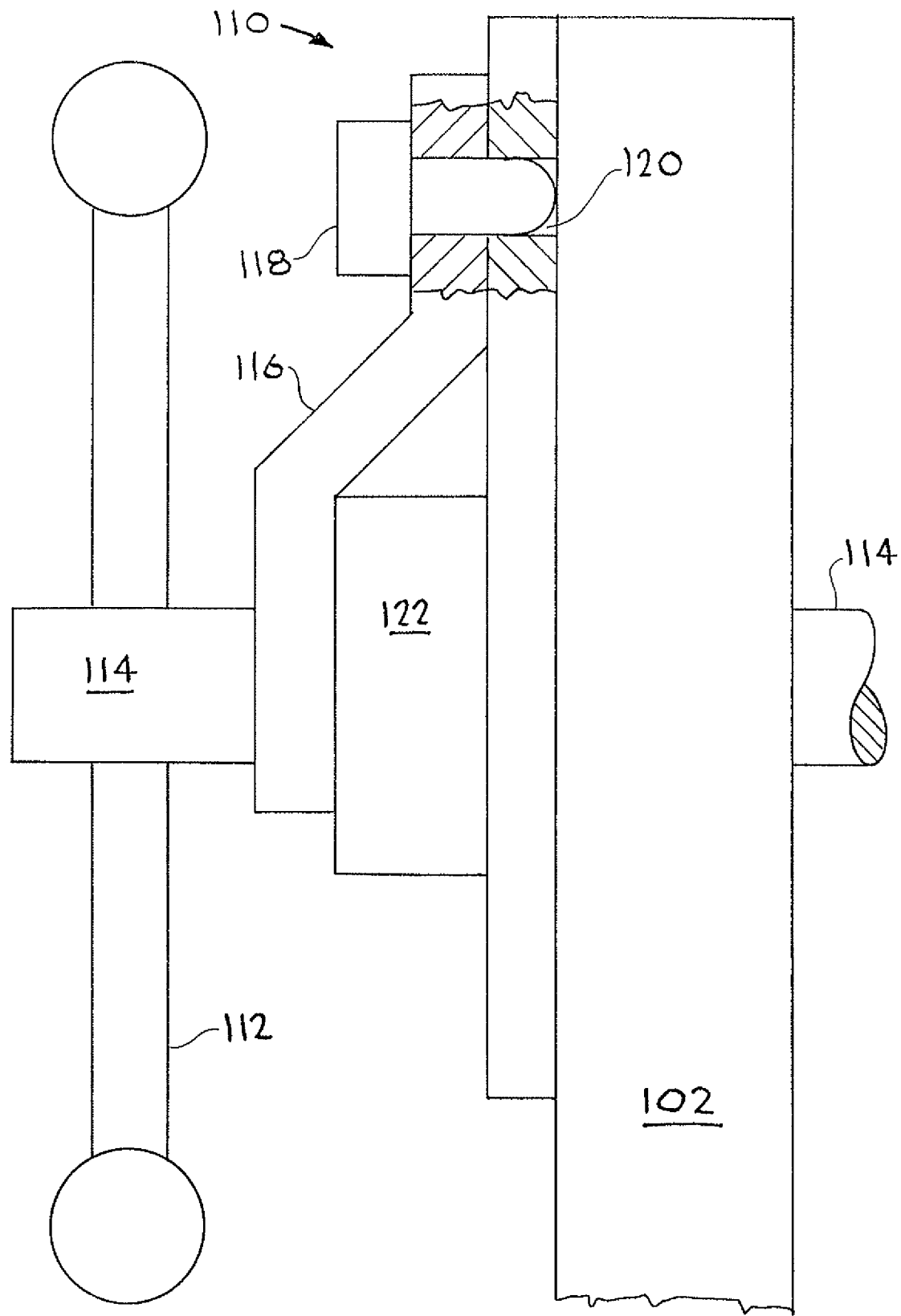
FIG. 2 illustrates the optics rotating and locking mechanism of the large optics stand of the present invention.

Having shown and described the basic large optics stand 100 we now move on to illustrate and describe the table rotating and locking mechanism 110. In FIG. 2 the optics rotating and locking mechanism 110 is illustrated. The mechanism 110 is attached to stand base 102. Shaft 114 passes thru bearing mechanism 122 and extends thru stand base 102 and attaches to the optics table 104, not shown in this view. Handle 112 is part of shaft 114 and is used to rotate the optics table 104. The locking arm 116 is also attached to shaft 114 and will rotate with shaft 114. Locking pin 118 is a spring loaded mechanism that will automatically enter hole 120 in stand base 102. Hole 120 can be a series of holes that can lock the optics table 104 in a number of position from horizontal to the vertical.

In one embodiment the optics rotating and locking mechanism 110 is comprised of (4) 2" ID bearings, (2) indexing plates, (2) indexing arms, (2) hand retractable spring plungers, and (2) handle assemblies. There are two bearings mounted to each of the A-Frame Structures that support the sum load. To tilt the optic into the vertical plane requires a minimum of two operators by design. In order for the platform to tilt it requires that both hand retractable spring plungers be released simultaneously. In the event that a person was to collapse or suddenly become incapable of the tilting process the spring loaded plunger would immediately lock into the next position. Other fail safes include hard stops at the extreme of both travel directions preventing the system from tilting past 90° from horizontal. These fail safes are very important when dealing with high value items.

The rotating and locking mechanism 110 is on both sides of the large optics stand 100. Two operators are required to rotate the optics table 104 and the automatic locking pin 118 will secure the table safely should one of the operators become incapacitated. The rotating mechanism can also be motorized allowing single operator or even remote operation of the optics table.

Figure 3:
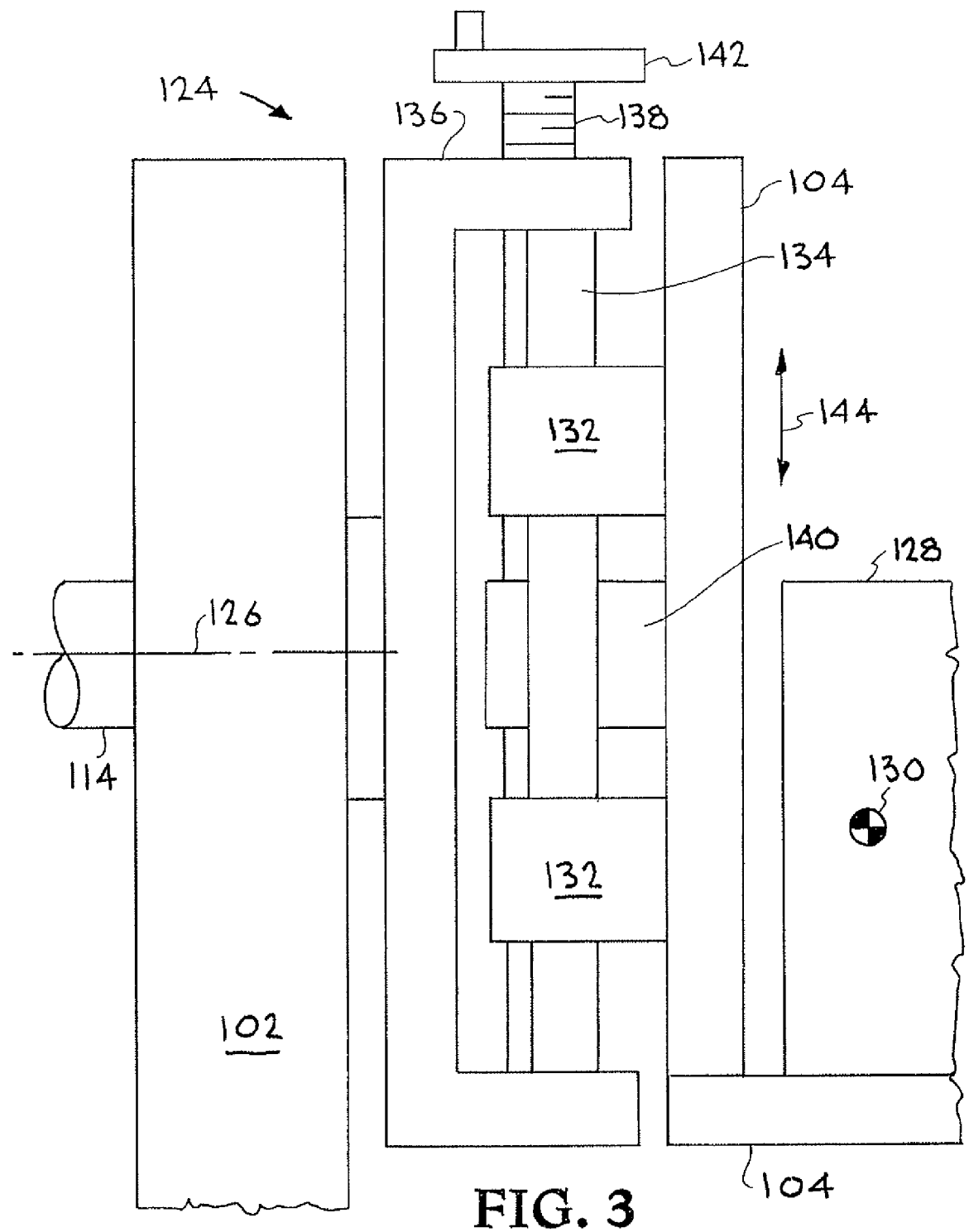
FIG. 3 illustrates an adjustable center of mass system to align the large optics center of mass with the axis of rotation of the large optics stand.

Referring now to FIG. 3 a mechanism 124 is illustrated that can be used with the large optics stand 100. The mechanism 124 is an adjustable center of mass system to align the large optics center of mass with the axis of rotation of the large optics stand 100. The mechanism 124 allows for aligning the center of gravity 130 of a large optics 128 with the center of rotation 126. This alignment increases both the safety and ease of operation. The frame 136 is secured to shaft 114. Shaft 134 is integral to frame 136 bearing 132 are free to travel on shaft 134. Bearings 132 are secured to optics table 104. Threaded shaft 138 is also integral to frame 136. A traveling nut 140 surrounds threaded shaft 138 and is fastened to optics table 104. By turning wheel 142 the traveling nut will move up and down on the threaded shaft 138 as shown by arrow 144. As the traveling nut 140 is fastened to the optics table 104, this in effect can be used to align the center of rotation 126 and the center of gravity 130 of the large optics 128 which is secured to optics table 104.

In one embodiment the mechanism 124 is designed to enable the inspection stand 100 to safely handle optics and other high value parts of varying weights and sizes. The design behind the linear bearing system enables the combined center of mass of any given product to be aligned with the axis of rotation. This is very critical when dealing with large, fragile, and often extremely heavy optics. With this system the center of mass of the load is always aligned with the axis of rotation. This is extremely beneficial as there are no forces to counteract when tilting the optic. This allows for a very safe controlled means of rotating varying weight and size critical high value products. This design in parallel with the minimum 2-person operation and spring loaded fail safes makes this unit extremely safe and eliminates the possibility of human error and even the extreme case wherein a person may collapse or become unable to perform their duties. When dealing with fragile products or high valued products such as optics of this scale it is crucial to have a system of this nature in place. The linear bearing system consists of: pillow black bearings, ground bearing shaft, acme type screw (for adjustment) and the necessary mounting plates.

Figure 4:
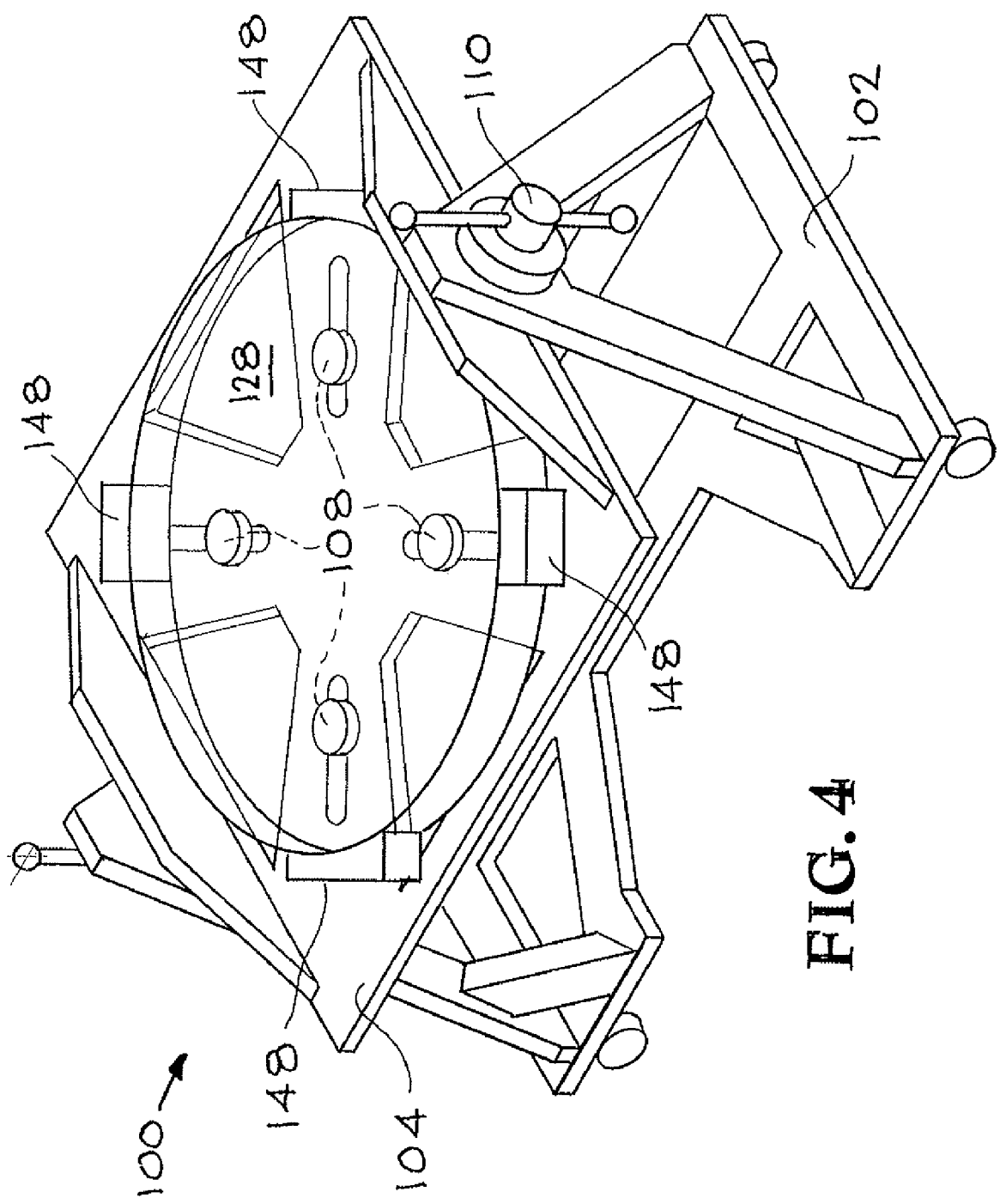
FIGS. 4 and 5 illustrate the large optics stand that provides a risk free means of safely tilting large optics with ease
Figure 5:
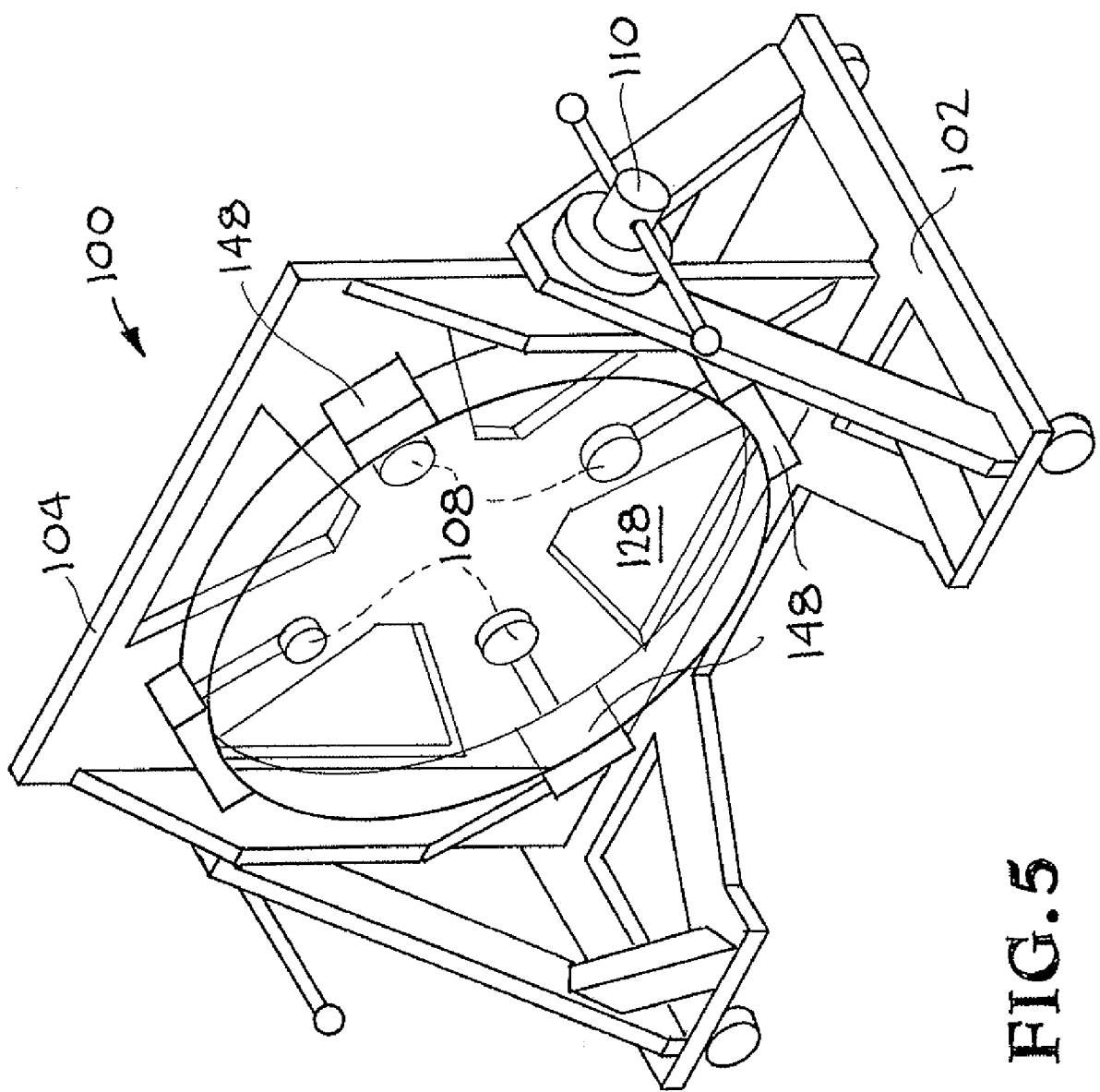

Referring now to FIGS. 4 and 5 the large optics stand 100 that provides a risk free means of safely tilting large optics and or fragile high dollar value materials with ease is illustrated. FIG. 4 is similar to FIG. 1 with the addition of a large optics 128 and restraint saddles 148. The large optics 128 arrive in the horizontal position in an appropriate shipping container. After unpacking the optics 128, a special fixture lifts the optics 128 and installs the optics 128 on the optics table 104 still in the horizontal position, Depending on optics geometry and weight, the optics support pads diameter and placement can be adjusted as needed.

In one embodiment the system uses "end-effector supports." The end-effector consists of the: base mounting plate, linear bearing mounting plates, restraints (saddle type clamps), and structural ribbing. The end-effector supports support the weight of the optic 128. The weight of the optic and the effector are distributed along both leading edges through the linear bearing mounting plate. Table 2 below provides a list of components of the optic stand in the horizontal position and shows the location of components.

TABLE 2

| Component | Location |
| --- | --- |
| Base Mounting Plate | 104 |
| Linear Bearing Mounting Plates | 100 |
| Restraints (Saddle Type) | 148 |
| Structured Ribbing | 104 |
| Support Pads | 148 |

On the top surface of the mounting plate there are tour T-slots cut out from the center of the plate equally spaced forming a cross pattern. These T-slots are used for mounting the saddle type clamps, or equivalent, depending on what type of product. The T-slots enable the system to handle all shapes and sizes of product making it a very universal tool. Additionally the four support pads that the optic rests on in the horizontal plane are mounted to the T-slots. This allows for multiple positions of support to accommodate varying shapes and sizes of parts. Additionally it allows for support about a parts/optics to minimize bending or droop.

FIG. 5 shows the optics table 104 rotated to the vertical position. The large optics have been safely tilted from the horizontal position shown in FIG. 4 to the vertical position. The optics are supported in the horizontal position by pads. Depending on the actual part geometry and weight, the optic support pad diameter and placement is adjusted as needed. In the vertical plane the optics are support by saddles that evenly distribute the optics weight over a large area. Specially design restraints can be put in place of the saddle supports, specific to each application, such that the optic can be evenly supported and/or isolated for optical metrology purposes. This stand can be used as a safer, more effective way, to support optics during traditional optic washing. Given that the high value added part is mechanically restrained, the inspection stand (or several stands) can be used to store optics in the vertical orientation, ultimately saving on floor space. Uses of the large optics stand include cleaning optics, inspecting optics, displaying optics, storage optics, dressing optics (support during bonding of features), and metrology. Table 3 below provides a list of components of the optic stand in the vertical position and shows the location of components.

TABLE 3

| Component | Location |
| --- | --- |
| Base Mounting Plate | 104 |
| Linear Bearing Mounting Plates | 100 |
| Restraints | 148 |
| Support Pads | 108 |

Figure 6:
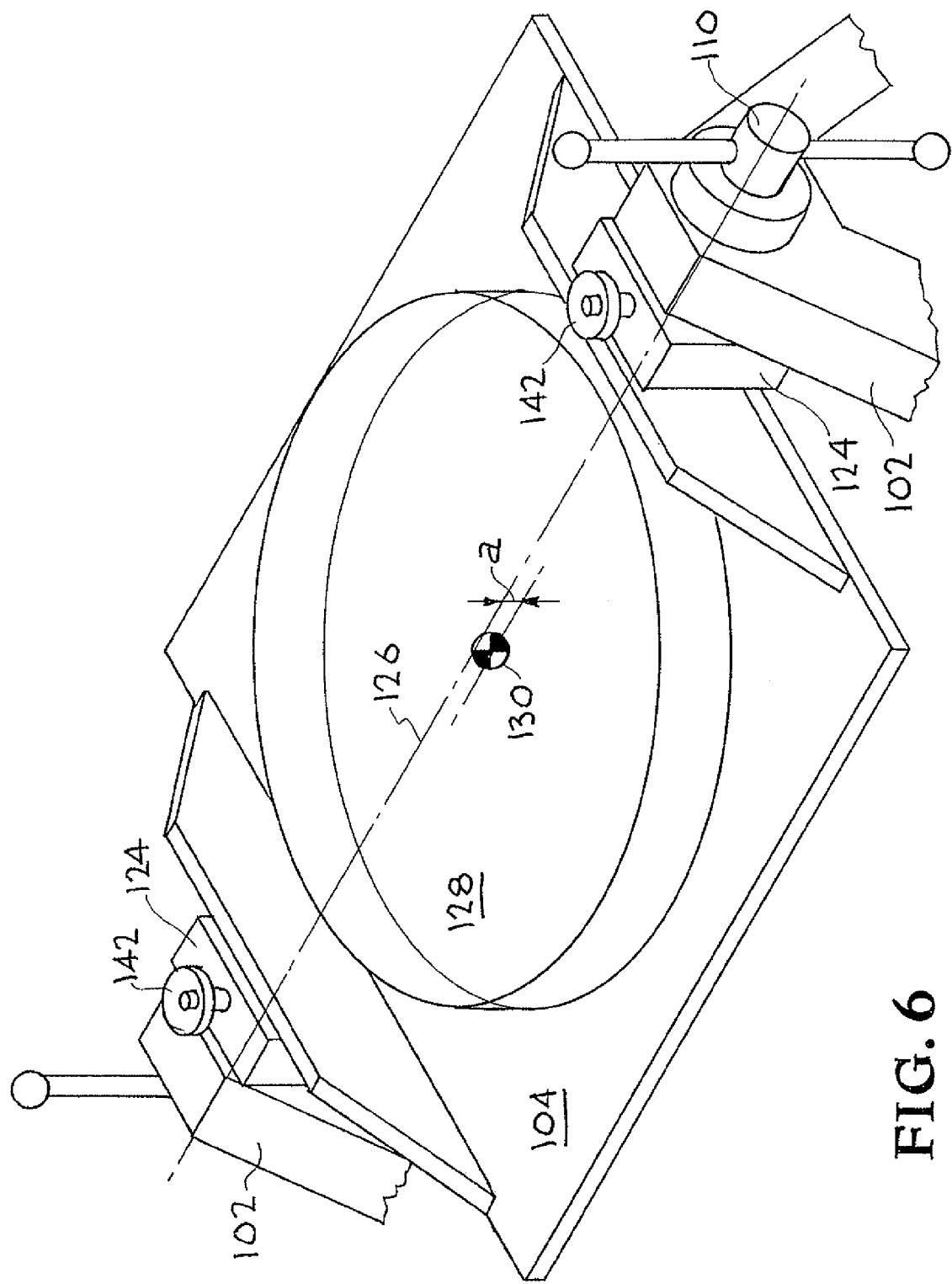
FIG. 6 is an illustration of alignment of the large optics center of mass with the axis of rotation of the large optics stand.

Referring now to FIG. 6 the adjustable center of mass system to align the large optics center of mass with the axis of rotation of said rotatable optics table is illustrated. The large optics 128 has a center of gravity 130. The rotatable optics table 104 has and axis of rotation 126. The center of gravity 130 of the large optics 128 is initially below the axis of rotation of the rotatable optics table 104. In order to safely rotate the large optics 128 from the horizontal position to the vertical position, the center of gravity 130 of the large optics 128 needs to be aligned with the axis of rotation 126 of the rotatable optics table 104.

FIG. 6 is a perspective view that illustrates the difference between the axis of rotation 126 of the large optics inspection stand 100 and the center of gravity 130 of a large optics 128. This distance labeled a on FIG. 6 can vary depending on the size and weight of the large optic 128. It is desirable to have the center of gravity 130 of a large optics 128 aligned with the axis of rotation 126 of the optics stand 102. Alignment of these axes will reduce the force required to rotate a large optics, this also increases the safety of handling large optical pieces.

FIG. 7A &7B illustrates bringing the center of gravity (C.G.) 130 of a large optics 128 in line with the axis of rotation 126 of the large optics inspection stand 100. As shown in FIG. 7A the C.G. 130 of the large optics 128 is below the axis of rotation 126. This distance is arbitrarily shown as the dimension labeled a. The C.G. could be either above or below the axis of rotation 126, in the case shown we have chosen below. By rotating the hand wheels 142 the rotatable optics table can be raised or lowered thus bringing the C.G. of the large optics 128 in alignment with the axis of rotation 126 as shown in FIG. 7B.

The mechanism 124 illustrated in FIG. 3 is used to align the center of mass 601 of the large optics 600 with the axis of rotation of the rotatable optics table 602 by moving the center of mass 601 of the large optics 600 upward into alignment with the axis of rotation of the rotatable optics table 602. The mechanism 124 is an adjustable center of mass system to align the large optics center of mass with the axis of rotation of the large optics inspection stand 100. The mechanism 124 allows for aligning the center of gravity 130 of a large optics 128 with the center of rotation 126. This alignment increases both the safety and ease of operation. The frame 136 is secured to shaft 114. Shaft 134 is integral to frame 136 bearing 132 are free to travel on shaft 134. Bearings 132 are secured to optics table 104. Threaded shaft 138 is also integral to frame 136. A traveling nut 140 surrounds threaded shaft 138 and is fastened to optics table 104. By turning wheel 140 the traveling nut will move up and down on the threaded shaft 138 as shown by arrow 144. As the traveling nut 140 is fastened to the optics table 104, this in effect is be used to align the center of rotation 126 and the center of gravity 130 of the large optics 128 which is secured to optics table 104.

The present invention provides a risk free method of safely tilting large optics and or fragile high dollar value materials with ease. The large optics arrive in a horizontal position in an appropriate shipping container. After unpacking the optics, a device lifts the optics and places the optics on the optics table still in the horizontal position. The optics are supported in the horizontal position by pads. In the vertical plane the optics are support by saddles that evenly distribute the optics weight over a large area. The optics are rotated to the vertical position by rotating the rotatable optics table and the large optic from the horizontal position to a vertical position.

The present invention provides a method of inspecting or washing or storing a large optic. The method includes the steps of providing large optics stand having a base frame and a rotatable optics table rotatably connected to the base frame, the rotatable optics table having optics support pads and optic restrains; positioning the large optic on the optics support pads on the rotatable optics table with the rotatable optics table in a horizontal position; positioning the optic restrains on the large optic; rotating the rotatable optics table and the large optic from the horizontal position to a vertical position; and inspecting or washing or storing the large optic. The large optics has a center of mass and the rotatable optics table has an axis of rotation. In one embodiment the method includes the steps of aligning the large optics center of mass with the axis of rotation of the rotatable optics table.

The present invention provides an efficient method of storing a large optic. The method includes the steps of providing large optics stand having a base frame and a rotatable optics table rotatably connected to the base frame. The rotatable optics table includes optics support pads and optic restrains. The method includes the steps of positioning the large optic on the optics support pads on the rotatable optics table with the rotatable optics table in a horizontal position and positioning the optic restrains on the large optic. The method includes the steps of rotating the rotatable optics table and the large optic from the horizontal position to a vertical position and storing the large optic.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A large optics stand apparatus, comprising:
a base frame,
a rotatable optics table rotatably connected to said base frame,
optics support pads on said rotatable optics table,
optic restrains on said rotatable optics table,
a linear bearing system connected to said base frame and said rotatable optics table, and a rotary bearing latch system wherein said rotary bearing latch system includes a shaft connected to said linear bearing system, a handle connected to said shaft, and a spring loaded locking pin selectively connected to said base frame.

2. A large optics inspection, washing, and storing stand apparatus for inspecting, washing, and storing a large optic, wherein the large optics has a center of mass, comprising:
a base frame;
a rotatable optics table rotatably connected to said base frame, said rotatable optics table having an axis of rotation;
optics support pads on said rotatable optics table;
optic restrains on said rotatable optics table;
a linear bearing system connected to said base frame and said rotatable optics table;

an adjustable center of mass system to align the large optics center of mass with the axis of rotation of said rotatable optics table, and a rotary bearing latch system, wherein said rotary bearing latch system includes a shaft connected to said linear bearing system, a handle connected to said shaft, and a spring loaded locking pin selectively connected to said base frame.

3. A large optics inspection, washing, and storing stand apparatus for inspecting, washing, and storing a large optic, wherein the large optics has a center of mass, comprising:

a base frame;

casters connected to said base frame;

a rotatable optics table rotatably connected to said base frame, said rotatable optics table having an axis of rotation;

optics support pads on said rotatable optics table;

slots in said rotatable optics table wherein said optics support pads are mounted in said slots;

optic restrains on said rotatable optics table;

a linear bearing system connected to said base frame and said rotatable optics table;

an adjustable center of mass system to align the large optics center of mass with the axis of rotation of said rotatable optics table; and a rotary bearing latch system that includes a shaft connected to said linear bearing system, a handle connected to said shaft, and a spring loaded locking pin selectively connected to said base frame.

\* \* \* \* \*